(12) United States Patent
Mori et al.

(10) Patent No.: US 7,875,107 B2
(45) Date of Patent: Jan. 25, 2011

(54) HYDROGEN STORAGE TANK AND ITS MANUFACTURING METHOD

(75) Inventors: Daigoro Mori, Mishima (JP); Keiji Toh, Kariya (JP); Katsuyoshi Fujita, Kariya (JP)

(73) Assignees: Toyota Jidosha Kabushiki Kaisha, Toyota-shi (JP); Kabushiki Kaisha Toyota Jidoshokki, Kariya-shi (JP)

( * ) Notice: Subject to any disclaimer, the term of this patent is extended or adjusted under 35 U.S.C. 154(b) by 267 days.

(21) Appl. No.: 12/140,677

(22) Filed: Jun. 17, 2008

(65) Prior Publication Data

US 2009/0000963 A1    Jan. 1, 2009

(30) Foreign Application Priority Data

Jun. 19, 2007    (JP) .............................. 2007-161227

(51) Int. Cl.
*F17C 11/00*      (2006.01)
(52) U.S. Cl. .......................................... 96/154; 206/0.7
(58) Field of Classification Search .................. 96/108, 96/154, 146; 206/0.7; 423/248, 648.1, 658.2; 420/900
See application file for complete search history.

(56) References Cited

U.S. PATENT DOCUMENTS

| | | | | |
|---|---|---|---|---|
| 4,196,525 A | * | 4/1980 | Ebdon et al. .................. 34/416 |
| 4,446,111 A | * | 5/1984 | Halene et al. ................ 422/200 |
| 4,457,136 A | * | 7/1984 | Nishizaki et al. ............. 62/46.2 |
| 4,667,815 A | * | 5/1987 | Halene ......................... 206/0.7 |
| 5,445,099 A | * | 8/1995 | Rendina ...................... 114/140 |
| 6,267,229 B1 | * | 7/2001 | Heung .......................... 206/0.7 |
| 6,626,323 B2 | * | 9/2003 | Stetson et al. ................ 220/577 |
| 7,112,239 B2 | * | 9/2006 | Kimbara et al. .............. 96/108 |
| 7,115,159 B2 | * | 10/2006 | Fujita et al. ................... 96/108 |
| 2002/0100369 A1 | * | 8/2002 | Kuriiwa et al. ................ 96/146 |
| 2005/0188847 A1 | * | 9/2005 | Fujita et al. ................... 96/126 |
| 2006/0065553 A1 | * | 3/2006 | Golben ......................... 206/0.7 |

FOREIGN PATENT DOCUMENTS

| | | |
|---|---|---|
| JP | 2001-241599 | 9/2001 |
| JP | 2005-240983 | 9/2005 |

* cited by examiner

*Primary Examiner*—Frank M Lawrence
(74) *Attorney, Agent, or Firm*—Oblon, Spivak, McClelland, Maier & Neustadt, L.L.P.

(57) ABSTRACT

A manufacturing method of a hydrogen storage tank stored with a hydrogen gas by including built-in hydrogen-occlusion alloys, has a stacking step of stacking plate members building up heat transfer fins, an arranging step of disposing the hydrogen-occlusion alloys between the neighboring plate members so as to form an area in which to dispose the hydrogen-occlusion alloys and an area in which to dispose none of the hydrogen-occlusion alloys, and a pressurizing step of forming air spaces sectioned by the plate members building up the heat transfer fins and containing the previously built-in hydrogen-occlusion alloys in a way that gets a part of the plate members deformed by pressurizing the plate members in a stacking direction thereof so as to restrict migrations of the hydrogen-occlusion alloys disposed in the arranging step.

11 Claims, 10 Drawing Sheets

HYDROGEN STORAGE TANK AND ITS MANUFACTURING METHOD

BACKGROUND OF THE INVENTION

The present invention relates to a method of manufacturing a hydrogen storage tank and to a hydrogen storage tank.

Over the recent years, a scheme for reducing carbon dioxide has so far involved using a hydrogen gas, an LPG (Liquid Petroleum Gas), a CNG (Compressed Natural Gas), etc as a fuel for an automobile etc. A requirement for these fuel gasses is that the fuel gasses can be stored in a gas tank and can be emitted for utilization when a necessity arises. Known as a method of storing the hydrogen gas is, for example, a technology of filling an interior of the tank with hydrogen-occlusion alloys and getting the hydrogen occluded by the filled hydrogen-occlusion alloys. This type of technology enables the hydrogen gas to be stored in a way that gets the hydrogen gas occluded by the hydrogen-occlusion alloys and to be utilized as a fuel by getting the hydrogen gas emitted from the hydrogen-occlusion alloys.

The hydrogen-occlusion alloys have a characteristic of expanding as the alloys occlude the hydrogen gas and contracting as the hydrogen gas is emitted therefrom. As a result, there arises a problem that the hydrogen-occlusion alloys precipitate, i.e., concentrate on one side (a deviation in density) in the tank due to the expansion and the contraction of the hydrogen-occlusion alloys. Another problem is that if the hydrogen is occluded in a state where the hydrogen-occlusion alloys concentrate on one side, i.e., get consolidated, an excessive stress occurs locally due to the expansion. Such being the case, a variety of technologies have been developed for solving these problems.

For example, Patent document 1 discloses a technology of adding a binder to the hydrogen-occlusion alloys into a paste state and, after coating the paste-like hydrogen-occlusion alloys over metal porous sheets, then forming hydrogen-occlusion sheets by pressurization, and laminating the sheets. Further, for example, Patent document 2 discloses a technology related to the hydrogen storage tank in which a body interior of the hydrogen storage tank is sectioned into a plurality of air spaces, and, after forming the sectioned air spaces, the sectioned air spaces are respectively filled with the hydrogen-occlusion alloys.

[Patent document 1] Japanese Patent Laid-Open Publication No. 2001-241599

[Patent document 2] Japanese Patent Laid-Open Publication No. 2004-162885

[Patent document 3] Japanese Patent Laid-Open Publication No. 2005-240983

[Patent document 4] Japanese Patent Laid-Open Publication No. 2005-105329

SUMMARY OF THE INVENTION

According to the technology of adding the binder to the hydrogen-occlusion alloys into a paste state and coating the paste-like hydrogen-occlusion alloys over the metal porous sheets, the deviation in density of the hydrogen-occlusion alloys can be restrained if within a fixed period. This technology, however, has a problem that if binding performance declines due to the expansion and the contraction of the hydrogen-occlusion alloys, it is difficult to maintain a molded body by the binder, and the hydrogen-occlusion alloys precipitate, i.e., concentrate on one side.

By contrast, according to the technology of sectioning the body interior of the hydrogen storage tank into the plurality of air spaces, and filling the formed air spaces respectively with the hydrogen-occlusion alloys, and the precipitation (the deviation in density) of the hydrogen-occlusion alloys can be restrained. In this technology, however, pores for filling the hydrogen-occlusion alloys must be formed in a part of the hydrogen storage tank, and the filling entails expending a good deal of time. Moreover, it is impossible to visually check whether the air spaces are sufficiently filled with the hydrogen-occlusion alloys or not. Accordingly, the check as to whether the air spaces are sufficiently filled with the hydrogen-occlusion alloys or not must involve measuring a weight of the hydrogen storage tank before and after being filled with the hydrogen-occlusion alloys. Thus, the technology given above has another problem that the filling operation of the hydrogen-occlusion alloys is extremely troublesome.

It is an object of the present invention to provide, in view of the problems described above, a technology capable of restraining the deviation in density of the hydrogen-occlusion alloys and obviating the troublesomeness of the filling operation of the hydrogen-occlusion alloys.

According to the present invention, a scheme for solving the problems described above is that in a state of disposing hydrogen-occlusion alloys between plate members building up heat transfer fins, the plate members get deformed by pressurization, air spaces sectioned by the plate members are thereby formed, and the hydrogen-occlusion alloys are confined into the air spaces. With this scheme, migrations of the hydrogen-occlusion alloys are restricted, and hence the deviation in density of the hydrogen-occlusion alloys can be restrained. Further, the hydrogen-occlusion alloys are previously built in before the plate members get deformed by the pressurization and do not therefore need performing the filling operation after being manufactured. Namely, according to the present invention, it is possible to obviate the troublesomeness of the filling operation of the hydrogen-occlusion alloys, which has hitherto been a problem.

Specifically, the present invention is a manufacturing method of a hydrogen storage tank stored with a hydrogen gas by including built-in hydrogen-occlusion alloys, comprising: an arranging step of arranging the hydrogen-occlusion alloys so that plate members are each formed with an area in which to dispose the hydrogen-occlusion alloys and an area in which to dispose none of the hydrogen-occlusion alloys; a stacking step of stacking the plate members by superimposing the plate members; and a pressurizing step of forming air spaces sectioned by the plate members and containing the previously built-in hydrogen-occlusion alloys by pressurizing the plate members in a way that restricts migrations of the hydrogen-occlusion alloys in a stacked state of the plate members, the hydrogen-occlusion alloys being disposed between the neighboring plate members.

The manufacturing method of the hydrogen storage tank according to the present invention has a feature that the hydrogen-occlusion alloys (Metal Hydride) are built in also at a stage of manufacturing the hydrogen storage tank. Then, according to the present invention, the hydrogen-occlusion alloys are disposed between the plate members building up the heat transfer fins, the plate members get deformed by pressurization in the stacking direction, the air spaces sectioned by the plate members are thereby formed, and the hydrogen-occlusion alloys are confined into the air spaces, thereby enabling the hydrogen-occlusion alloys to be built in the tank when manufactured. The plate members for forming the heat transfer fins may be enough if having a heat transfer property. Incidentally, it is preferable that the plate members for forming the heat transfer fins are deformable. The plate member to be stacked can involve using a flat plate member.

This is because the flat plate member gets deformed by the pressurization, whereby the air spaces containing the built-in hydrogen-occlusion alloys can be formed.

A ratio of the area in which to dispose the hydrogen-occlusion alloys to the area in which to dispose none of the hydrogen-occlusion alloys and a disposition mode are not particularly limited. It is, however, preferable that regularity is given when disposing the hydrogen-occlusion alloys such as fixing the ratio between the areas and unifying the modes of the areas, and this regularity enables workability to be improved. Further, in the manufactured hydrogen storage tank, a quantity of the hydrogen gas to be stored and a quantity of the hydrogen gas to be discharged can be easily managed by giving the regularity to the disposition of the hydrogen-occlusion alloys.

Upon completion of disposing the hydrogen-occlusion alloys and stacking the plate members, the plate members are pressurized in the state where the hydrogen-occlusion alloys are disposed. More specifically, in the state where the hydrogen-occlusion alloys are disposed between the neighboring plate members and in the state where the plate members are stacked, the plate members are pressurized so as to restrict migrations of the hydrogen-occlusion alloys. The restriction of the migrations of the hydrogen-occlusion alloys implies that the plate members surround and cover the peripheries of groups of hydrogen-occlusion alloys. Namely, because of the hydrogen-occlusion alloys being already disposed between the plate members, an interval between the plate members is gradually narrowed as the plate members are pressurized in the stacking direction. Then, when further pressurized, the plate members get deformed, with the result that partial surfaces, with no intermediary of the hydrogen-occlusion alloys, in the face-to-face surfaces of the neighboring plate members, abut on each other and that the peripheries of the hydrogen-occlusion alloys are sectioned by the plate members. Namely, the plurality of air spaces containing the previously built-in hydrogen-occlusion alloys can be formed. Note that the pressure in the pressurizing step may be properly adjusted in consideration of a material of the plate member.

It should be noted that according to the present invention, the arranging step may include disposing the hydrogen-occlusion alloys on any one of the neighboring plate members, the stacking step may include stacking the plate members on which the hydrogen-occlusion alloys are disposed, and the pressurizing step may include forming the air spaces sectioned by the plate members and containing the previously built-in hydrogen-occlusion alloys by pressurizing the plate members stacked in the stacking step. With this contrivance, the hydrogen-occlusion alloys are disposed between the plate member and the plate member, and these plate members can be pressurized in the state where the plurality of plate members is stacked. Note that according to the present invention the plate members, after the hydrogen-occlusion alloys etc have been disposed on the respective plate members, are sequentially stacked, however, in place of this scheme, for example, the plurality of plate members may be stacked at a predetermined interval, and the hydrogen-occlusion alloys may be disposed between the neighboring plate members. Thus, an acceptable state according to the present invention is that the hydrogen-occlusion alloys are disposed between the plate member and the plate member when pressurized in the pressurizing step, and the plurality of these plate members is stacked. A step sequence between disposing the hydrogen-occlusion alloys and stacking the plate members is not particularly limited.

Herein, the arranging step may include arranging the area in which to dispose the hydrogen-occlusion alloys and the area in which to dispose none of the hydrogen-occlusion alloys in a stripe pattern and disposing the hydrogen-occlusion alloys so that the stripes are not overlapped between the neighboring plate members. According to the present invention, the area in which to dispose the hydrogen-occlusion alloys and the area in which to dispose none of the hydrogen-occlusion alloys are alternately arranged in the stacking direction and in a direction orthogonal to the stacking direction. Namely, the hydrogen-occlusion alloys are disposed in a grid-like configuration as viewed in section. Accordingly, the plate members are pressurized in this disposing state, whereby substantially the grid-like air spaces containing the built-in hydrogen-occlusion alloys can be formed. Note that the pressurization may be attained simply by applying the pressure uniformly over the entire surface of the plate member, and hence, according to the present invention, the plurality of grid-like air spaces as viewed in section can be formed in an extremely simple procedure.

Further, according to the present invention, the arranging step may include disposing the hydrogen-occlusion alloys in a way that bonds the hydrogen-occlusion alloys to any one of the neighboring plate members. The hydrogen-occlusion alloys can be prevented from scattering during a work by bonding the hydrogen-occlusion alloys, and the workability can be thereby improved.

Moreover, according to the present invention, a particle size of the hydrogen-occlusion alloys can be set on the order of 500 um (micrometer) through 1000 um. The hydrogen-occlusion alloy has a property of expanding when occluding the hydrogen. Therefore, an adjustment of a rate of the hydrogen-occlusion alloys filling up the respective air spaces sectioned by the plate members, in other words, an adjustment of a volume density entails taking the expansion when occluding the hydrogen into consideration. According to the present invention, the particle size of the hydrogen-occlusion alloys is specified within the predetermined range, and hence the volume density can be readily adjusted.

Furthermore, a hydrogen storage tank stored with a hydrogen gas, comprises: plate members sectioning a plurality of air spaces and forming heat transfer fins; and hydrogen-occlusion alloys built in the air spaces, wherein the neighboring air spaces in the plurality of air spaces are independent of each other.

The hydrogen storage tank according to the present invention can be manufactured by the manufacturing method of the hydrogen storage tank described above and is different from the conventional hydrogen storage tank in terms of the following points. To be specific, the known conventional hydrogen storage tank has a construction that an interior of the body of the hydrogen storage tank is sectioned into the plurality of air spaces. The conventional hydrogen storage tank is, however, provided with through-holes that establish connections between a filling hole for filling the tank body with the hydrogen-occlusion alloys and the air spaces so that the filled hydrogen-occlusion alloys spread over all of the air spaces. By contrast, in the hydrogen storage tank according to the present invention, the neighboring air spaces are independent of each other. Namely, the hydrogen storage tank according to the present invention has no necessity for providing the components such as the filling hole and the through-holes. This is because the hydrogen storage tank according to the present invention has such a contrivance different from the conventional hydrogen storage tank that the air spaces contain the previously built-in hydrogen-occlusion alloys. Thus, the hydrogen storage tank according to the present invention has a much simpler configuration than those conventional and is easy for maintenance. Further, according to the present invention, the hydrogen-occlusion alloys are built in the sectioned air spaces, and consequently the migrations of the hydrogen-occlusion alloys are restrained. As a result, the hydrogen-occlusion alloys can be restrained from precipitating, i.e., concentrating on one side. Moreover, the hydrogen storage tank according to the present invention has, because of being filled with the hydrogen-occlusion alloys beforehand, no necessity for performing the filling operation of the hydrogen-occlusion alloys and can therefore obviate the troublesomeness of the filling operation.

It should be noted that the hydrogen-occlusion alloys built in the air spaces are bonded to the plate members which form the air spaces. According to the present invention, the built-in hydrogen-occlusion alloys are bonded to the heat transfer fins (the plate members), and therefore the migrations of the hydrogen-occlusion alloys are restrained more effectively. As a consequence, the deviation in density of the hydrogen-occlusion alloys can be effectively restrained.

According to the present invention, it is feasible to provide the technology capable of restraining the deviation in density of the hydrogen-occlusion alloys and to obviate the troublesomeness of the filling operation of the hydrogen-occlusion alloys.

DETAILED DESCRIPTION OF THE INVENTION

Next, embodiments of a hydrogen storage tank and a manufacturing method thereof according to the present invention will hereinafter be described with reference to the drawings. Note that the first embodiments will exemplify a high-pressure MH (Metal Hydride) tank mounted in a fuel cell car.

First Embodiment (Configuration)

Figure 1:
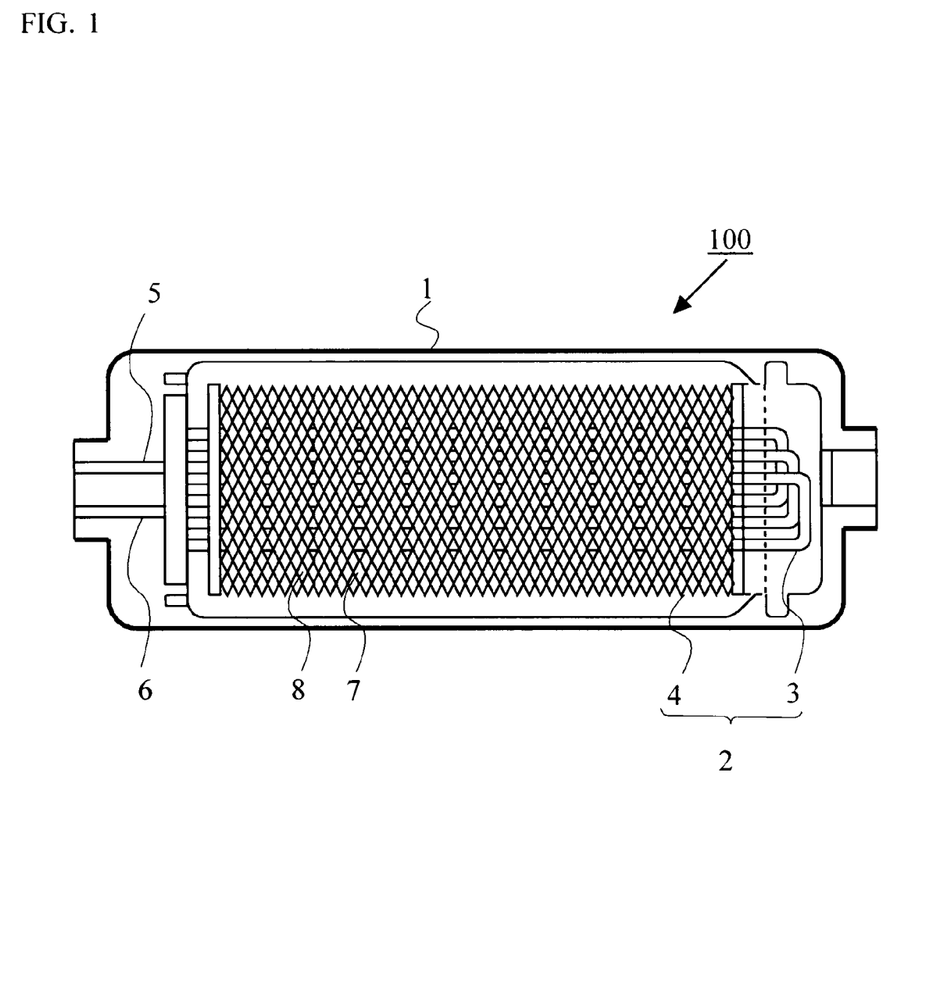
FIG. 1. A sectional view showing a hydrogen storage tank in a first embodiment.

FIG. 1 is a sectional view showing a hydrogen storage tank 100 by way of one embodiment. The hydrogen storage tank 100 in the embodiment includes a heat exchanger 2 installed inside a cylindrical tank body 1. The hydrogen storage tank 100 is, as illustrated in FIG. 1, normally used as a transversally-mounted tank. Note that heat-transfer related constructive members such as the tank body 1 and the heat exchanger 2 can be composed of metals exhibiting a high heat-transfer property such as aluminum and copper.

The heat exchanger 2 is constructed of a refrigerant/heat medium tube 3 via which mediums for heating and for refrigeration (a heating medium, a refrigerant) are circulated, and a plurality of heat transfer fins 4 brazed to an outer periphery of the refrigerant/heat medium tube 3. The heat exchanger 2 in the embodiment is of a so-called fin-and-tube type. In the heat exchanger 2 according to the embodiment, the mediums flowing in via an inflow portion 5 are circulated through the U-shaped refrigerant/heat medium tube 3 and discharged from an outflow portion 6. Note that in the first embodiment, there are provided three piece of U-shaped refrigerant/heat medium tubes but the present invention is not limited to this number of tubes. A shape and the number of the refrigerant/heat medium tubes 3 can be properly changed corresponding to a shape etc of the heat transfer fins 4.

The heat transfer fins 4 are stacked in a direction in which the refrigerant/heat medium tube 3 extends (in a longitudinal direction of the tank body 1). A plurality of air spaces 7 filled with hydrogen-occlusion alloys 8 is formed between the stacked heat transfer fins 4. With this configuration, a heat exchange is conducted between the mediums circulated through the refrigerant/heat medium tube 3 and the hydrogen-occlusion alloys 8 filling up the air spaces 7 via the heat transfer fins 4.

Figure 2:
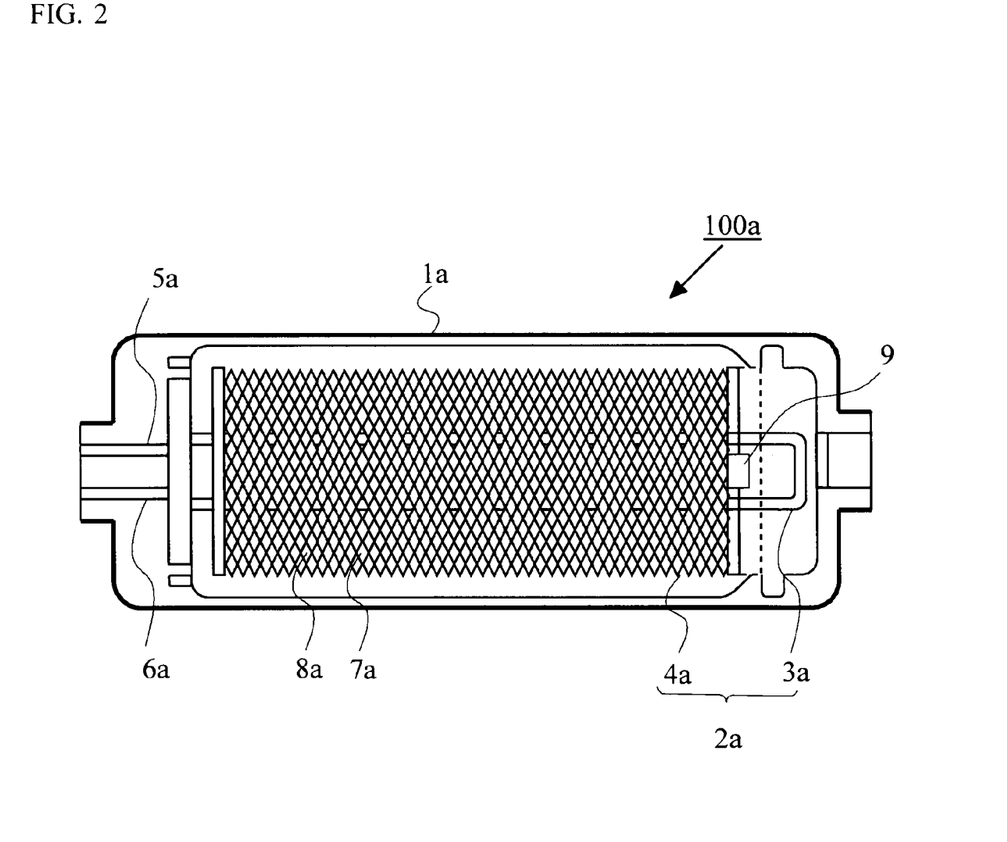
FIG. 2. A sectional view showing a conventional hydrogen storage tank.

Incidentally, in a conventional hydrogen storage tank 100a, the filling of the hydrogen-occlusion alloys 8 is carried out after completion of the hydrogen storage tank. Herein, FIG. 2 shows a sectional view of the conventional hydrogen storage tank 100a. As illustrated in FIG. 2, the conventional hydrogen storage tank 100a, similarly to the hydrogen storage tank 100 according to the first embodiment, includes a heat exchanger 2a installed inside a cylindrical tank body 1a. Further, the heat exchanger 2a is constructed of a plurality of heat transfer fins 4a brazed to an outer periphery of the refrigerant/heat medium tube 3a. Air spaces 7a are formed between the plurality of stacked heat transfer fins 4a. Accordingly, the conventional hydrogen storage tank 100a and the hydrogen storage tank 100 according to the first embodiment have some common points. The conventional hydrogen storage tank 100a, however, requires the filling of the hydrogen-occlusion alloys 8a after the completion, and is therefore, in addition to the configuration described above, formed with a filling hole 9 and through-holes (unillustrated).

The filling hole 9 is a hole via which the hydrogen storage tank 100a communicates with the outside for filling the hydrogen-occlusion alloys 8, and is formed by one in an edge portion of the hydrogen storage tank 100a in the longitudinal direction. The through-holes are holes for guiding the hydrogen-occlusion alloys 8 filling via the filling hole 9 to the air spaces 7a and are formed so as to establish connections between the neighboring air spaces 7. Accordingly, all of the air spaces 7 can be filled with the hydrogen-occlusion alloys 8 by sequentially filling the hydrogen-occlusion alloys 8 via the filling hole 9. The conventional hydrogen storage tank 100a involves filling the hydrogen-occlusion alloys 8 by use of the filling hole 9 and the through-holes described above, however, this filling operation is extremely troublesome. The hydrogen storage tank 100 (see FIG. 1) according to the first embodiment does not, however, entail performing such a filling operation and can obviate the troublesomeness. The hydrogen-occlusion alloys 8 filling up the air spaces 7 are the pre-filled alloys when manufacturing the hydrogen storage tank 100, more specifically, on the occasion of forming the air spaces 7 by working the heat transfer fins 4. The hydrogen storage tank 100 according to the first embodiment does not entail performing the filling operation of the hydrogen-occlusion alloys 8.

(Manufacturing Method)

Next, a manufacturing method of the hydrogen storage tank 100 described above in the first embodiment will hereinafter be explained with reference to the drawings. Note that the hydrogen storage tank 100 according to the first embodiment discussed above has a characteristic that the air spaces 7 formed between the heat transfer fins 4 are filled beforehand with the hydrogen-occlusion alloys 8. In terms of an aspect of the manufacturing method thereof, a main feature lies in a process of forming the air spaces 7 between the heat transfer fins 4 filled previously with the hydrogen-occlusion alloys 8. Therefore, the following discussion will be focused on this point.

Figure 3:
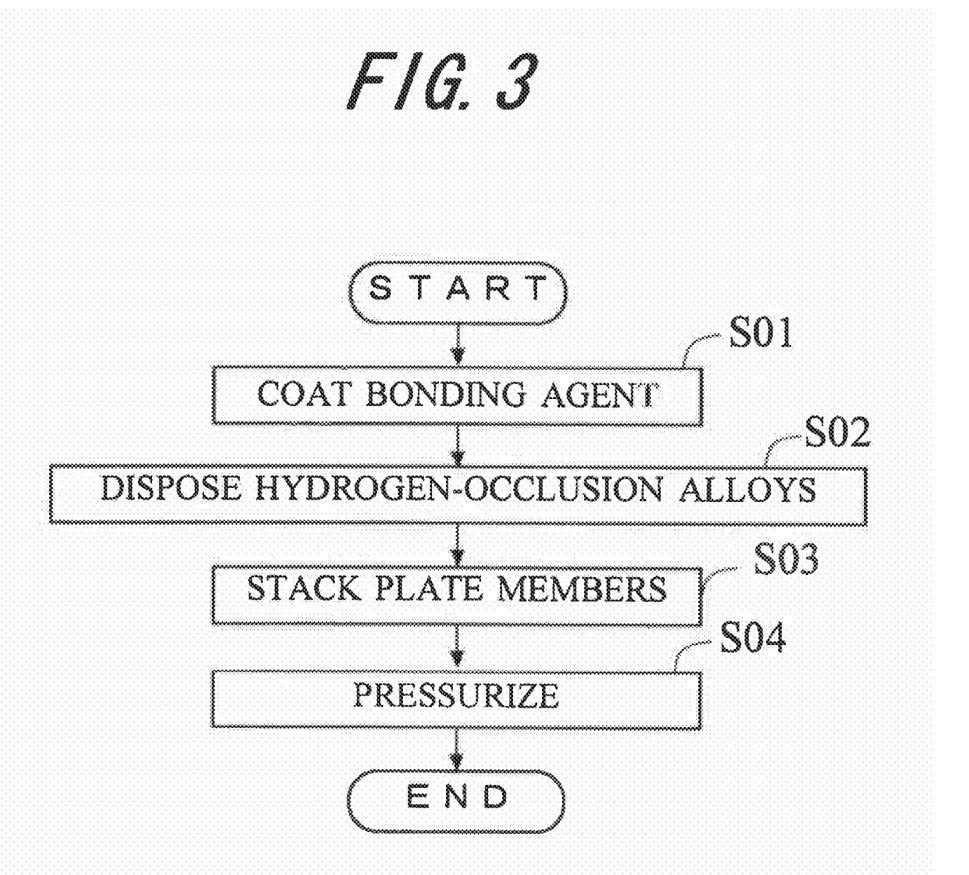
FIG. 3. A flowchart of manufacturing the hydrogen storage tank in the first embodiment.
Figure 4:
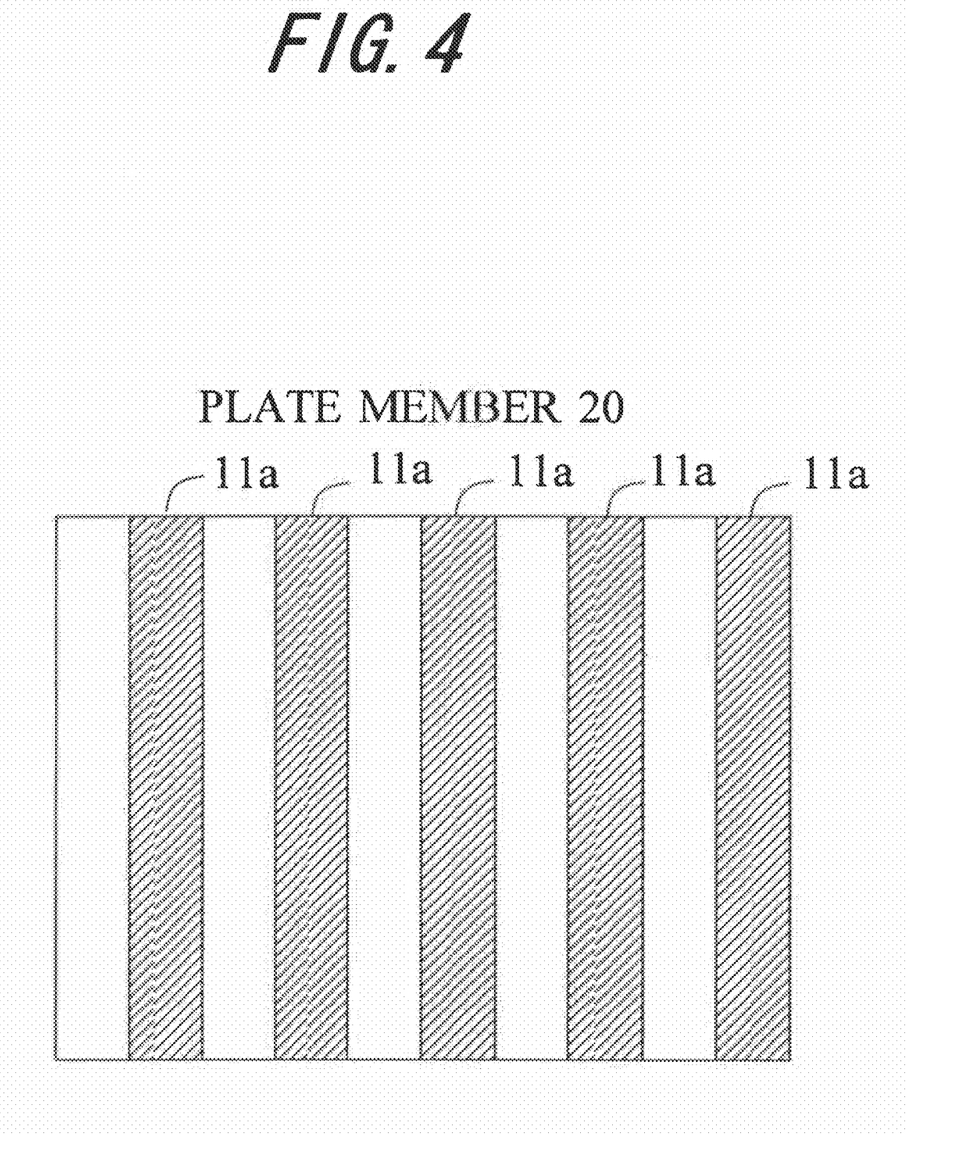
FIG. 4. A view showing an upper surface of a plate member to which a bonding agent is applied.

FIG. 3 shows a flow of how the hydrogen storage tank 100 in the first embodiment is manufactured. As shown in FIG. 3, in step S01, a bonding agent 11 is applied to plate members 20, 30 which build up the heat transfer fins 4. Note that the plate members 20, 30 serve to distinguish between the neighboring plate members. The bonding agent 11 is applied in a stripe shape over an upper surface of the aluminum plate member 20. A width of the stripe can be set to 3 mm through 10 mm, and an interval between the stripes can be set to 10 mm through 30 mm. FIG. 4 illustrates the upper surface of the plate member 20 coated with the bonding agent 11. As illustrated in FIG. 4, coated portions 11a and non-coated portions 12 are arranged in a stripe pattern at equal intervals on the upper surface of the plate member 20. A thickness of the plate member 20 is, though not particularly limited, preferably on the order of 0.2 mm through 1.0 mm in terms of considering deformability when being pressurized. It is to be noted that mainly the non-coated portions 12 coated with none of the bonding agent 11 get deformed when pressurized. The bonding agent 11 can involve using a low-melting metal and a resin hardening agent.

Figure 5:
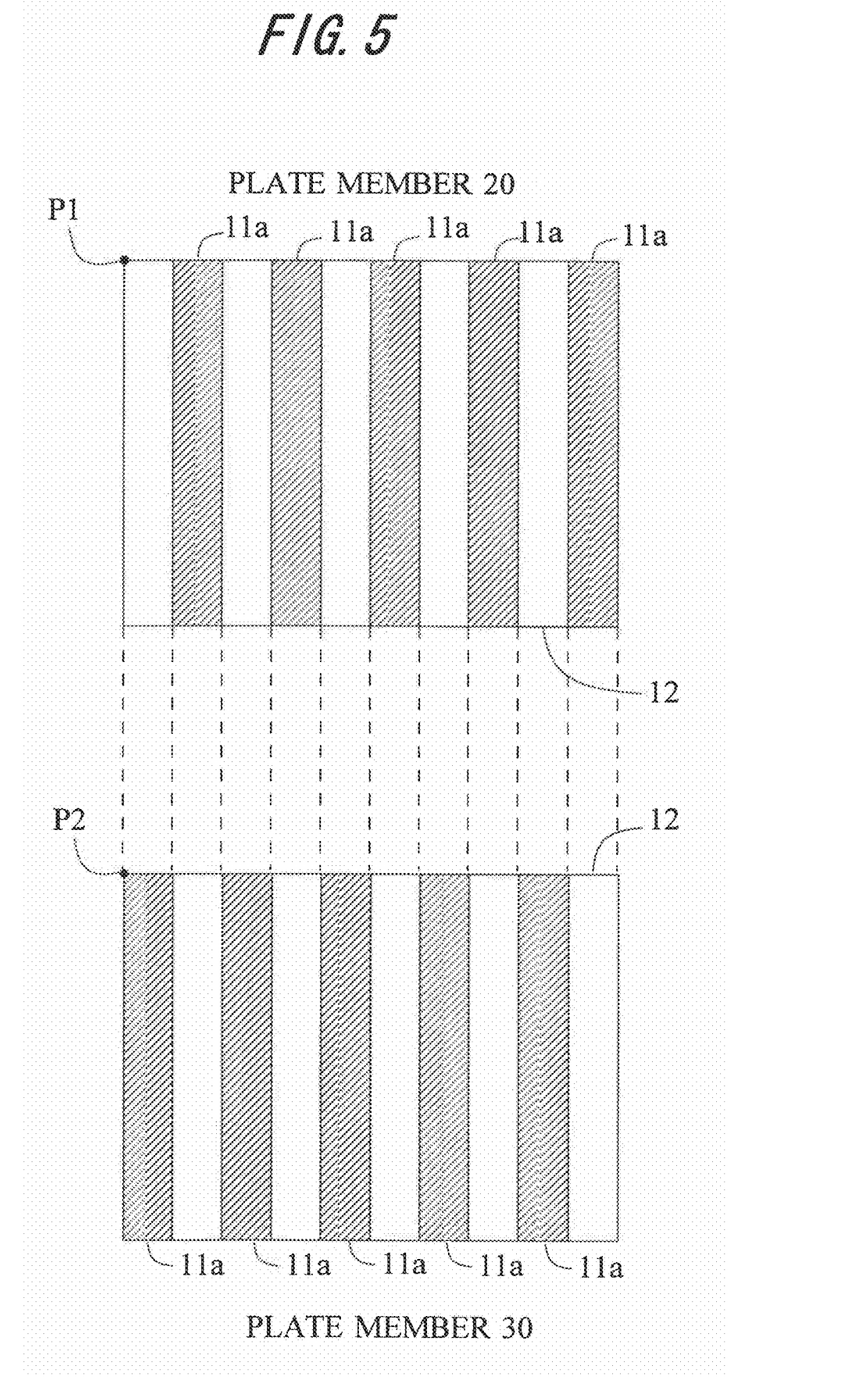
FIG. 5. A view showing a comparison between the upper surface of the plate member to which the bonding agent is applied and the upper surface of the plate member neighboring to the former plate member.

In the same procedure as described above, the bonding agent is applied in the stripe pattern over the upper surface of the plate member 30. The plate member 30 is the member positioned on an upper or lower side of the plate member 20 when stacked. The plate member 30 in itself is not substantially different from the plate member 20, however, the coated portions 11a coated with the bonding agent 11 are different from the coated portions 11a coated with the bonding agent 11 on the plate member 20. Namely, the bonding agent 11 is coated over the plate member 30 in such a way that the stripes formed on the plate member 20 are not overlapped in the stacking direction with the stripes formed on the plate member 30. FIG. 5 shows the upper surfaces in comparison between the plate member 20 coated with the bonding agent 11 and the plate member 30 coated with the bonding agent 11. As illustrated in FIG. 5, the stripes formed on the plate member 20 are not overlapped with the stripes formed on the plate member 30. Incidentally, P1 and P2 in FIG. 5 represent positioning points. Thus, the positioning points provided respectively at the plate member 20 and the plate member 30 enable alignment of the stripes and the arrangement of the plate members to be done at high efficiency. Upon completion of applying the bonding agent 11, the operation proceeds to next step.

In step S02, the hydrogen-occlusion alloys 8 are disposed. Namely, the hydrogen-occlusion alloys 8 are disposed on the bonding agent 11 applied in step S01. The hydrogen-occlusion alloys 8 are thus disposed, with the result that the stripes based on hydrogen-occlusion alloys 8 are formed on the upper surfaces of the plate member 20 and the plate member 30. Note that the width of the stripe formed by the hydrogen-occlusion alloys 8 and the interval between the stripes may be adjusted to the stripes formed by coating the bonding agent 11. Accordingly, the width of the stripe formed by the hydrogen-occlusion alloys 8 may be set to 3 mm through 10 mm, and the interval between the stripes may be set to 10 mm through 30 mm. Moreover, a height (thickness) of the hydrogen-occlusion alloys 8 may be set to 3 mm through 10 mm. Note that the width of the stripe formed by the hydrogen-occlusion alloys 8 is set to 10 mm, the interval between the stripes formed by the hydrogen-occlusion alloys 8 is set to 10 mm, and the height of the hydrogen-occlusion alloys 8 is 3 mm in the first embodiment. With the processes done so far, the disposition of the hydrogen-occlusion alloys 8 is completed. Upon the completion of disposing the hydrogen-occlusion alloys 8, the operation proceeds to next step S03.

Incidentally, the hydrogen-occlusion alloys 8 used in the first embodiment can involve using a variety of alloys that have hitherto been known. For example, the usable alloys are MgNi series alloys, MgNiM series alloys (M is exemplified by V, Cr, Fe, Co, Cu, Zn and Be) and MgCa series alloys of which the main component is magnesium. Alternatively, the available alloys are CaNi series alloys and CaMmNi series alloys (Mm is a misch metal that is a mixture of rare earth metals) of which the main components are calcium and nickel. Further available alloys are LaNi series alloys and LaNiCo series alloys of which the main components are Lanthanum and nickel. Still further available alloys are TiFe series alloys, TiFeMn series alloys, TiFeMnZr series alloys, TiFeMnZrAl series alloys, TiCr series alloys, TiCrV series alloys and TiCo series alloys.

Moreover, it is preferable that a particle size of the hydrogen-occlusion alloys 8 be restricted within a predetermined range. This is because the hydrogen-occlusion alloys 8 have a property of expanding when occluding the hydrogen, and, if the particle size of the hydrogen-occlusion alloys 8 is too large or too small, it is difficult to adjust a volume density. The particle size of the hydrogen-occlusion alloys 8 can be set to, e.g., 500 um through 1000 um. Note that even in the case of the hydrogen-occlusion alloys 8 of which the particle size is within this range, the particle size comes to several 10 um when occluding the hydrogen.

Figure 6:
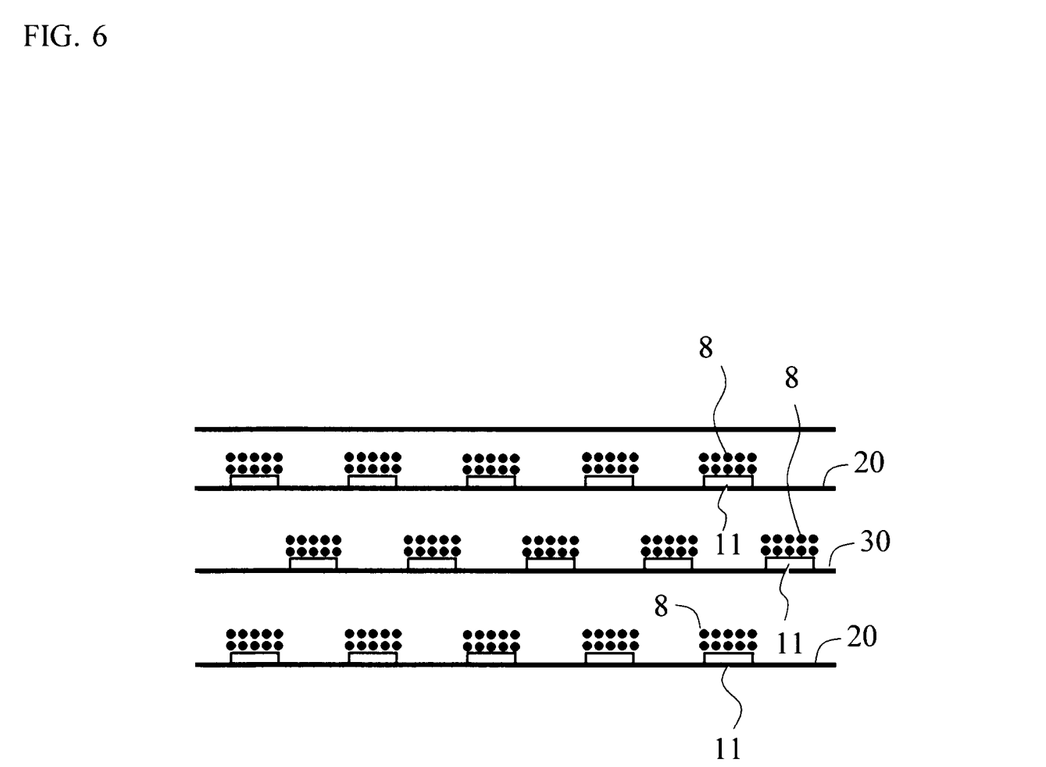
FIG. 6. A view showing a state of stacking the plate members on which hydrogen-occlusion alloys are disposed.

In step S03, the plate members 20 and the plate members 30 are alternately stacked. The hydrogen-occlusion alloys 8 are disposed in the stripe pattern on the plate member 20, while on the plate member 30 the hydrogen-occlusion alloys 8 are disposed in the stripe pattern that does not overlap with the stripes on the plate member 20. Accordingly, these plate members 20, 30 are alternately stacked above each other so that the hydrogen-occlusion alloys 8 are not overlapped with each other in the stacking direction. Herein, FIG. 6 illustrates a state of how the plate members 20 and the plate members 30, on which the hydrogen-occlusion alloys 8 are respectively disposed, are stacked. As shown in FIG. 6, the plate members 20 and the plate members 30 each having a different stripe arrangement are alternately disposed in the stacking direction. When the plate members 20 and the plate members 30 are completely stacked, the operation proceeds to step S04.

Figure 7:
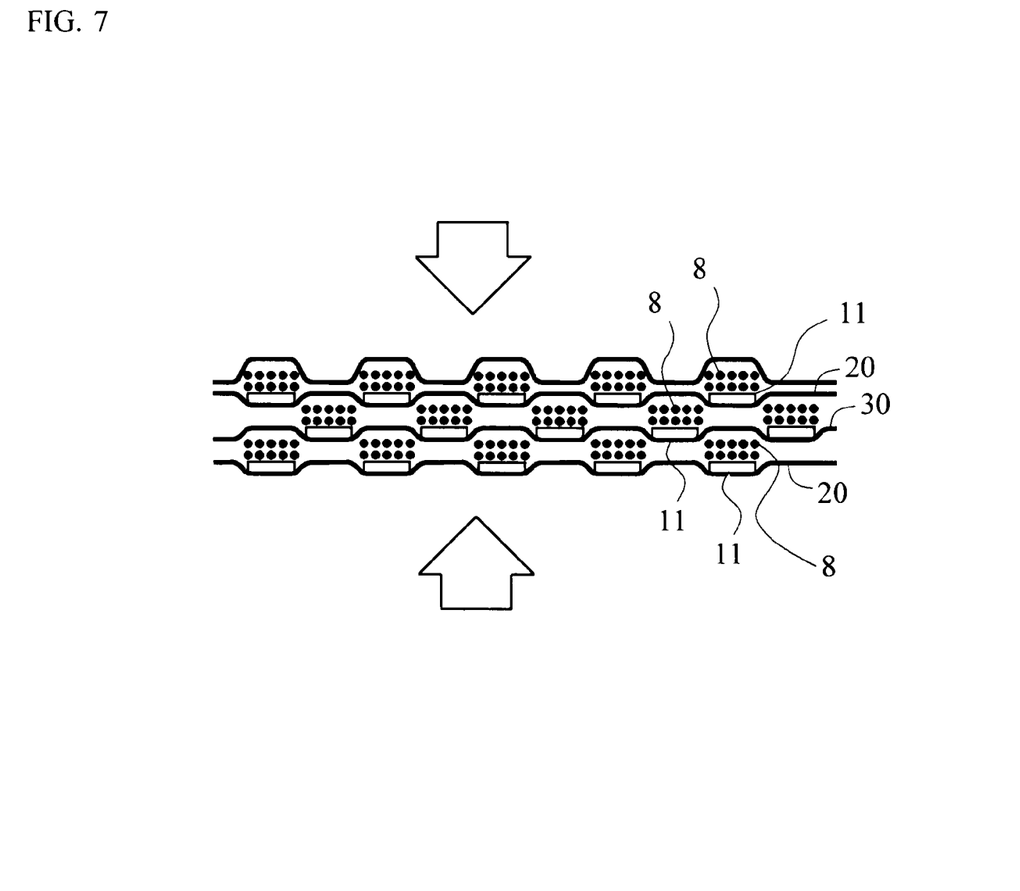
FIG. 7. A view showing a pressurized state of the plate members.
Figure 8:
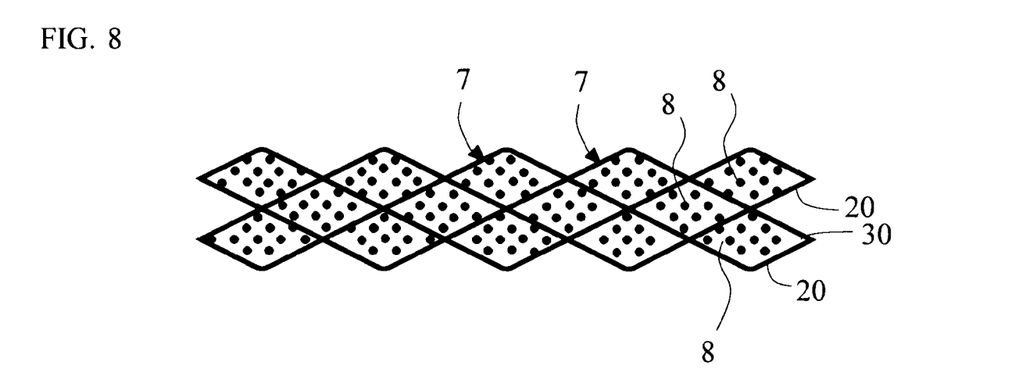
FIG. 8. A view showing a state of the plate members after being further pressurized.

In step S04, the plate members 20, 30 are pressurized in the stacked state. To be specific, the plate members 20 and the plate members 30 get deformed by the pressurization, and the upper surface of the plate member 20 abuts on the lower surface of the plate member 30. Herein, FIG. 7 shows a state in which the plate member 20 and the plate member 30 are pressurized. As illustrated in FIG. 7, the pressure is applied in the stacking direction, whereby the plate member 20 and the plate member 30 get deformed. As a result, it follows that the partial upper surface of the plate member 20, on which none of the hydrogen-occlusion alloys 8 are disposed, abuts on the partial lower surface of the plate member 30 corresponding to the partial upper surface on which the hydrogen-occlusion alloys 8 are disposed. Further, it follows that as for the partial upper surface of the plate member 20 on which the hydrogen-occlusion alloys 8 are disposed, the lower surface of the plate member 30 abuts on the upper sides of the hydrogen-occlusion alloys 8. Then, when the pressure is further applied, it follows that the hydrogen-occlusion alloys 8 disposed in the stripe pattern are sectioned by the plate member 20 and the plate member 30. FIG. 8 shows a state of how the plate member 20 and the plate member 30 become after being further pressurized. As shown in FIG. 8, the further pressurization comes to form a plurality of air spaces 7 sectioned by the plate member 20 and the plate member 30 and filled inside with the hydrogen-occlusion alloys 8.

In the hydrogen storage tank 100, the air spaces 7 provided between the heat transfer fins 4 and previously filled with the hydrogen-occlusion alloys 8 are completely formed by executing the processes in step S01 through step S04 explained above. When the formation of the heat transfer fins 4 is completed, the heat transfer fins 4 are installed together with the refrigerant/heat medium tube 3 into the tank body 1. As a result, the hydrogen storage tank 100 including the previously built-in hydrogen-occlusion alloys 8 is completed.

According to the hydrogen storage tank 100 in the first embodiment discussed above, the pre-filled hydrogen-occlusion alloys 8, unlike the conventional hydrogen storage tank 100a, eliminates a necessity for filling the hydrogen-occlusion alloys 8. As a result, it is feasible to obviate the troublesomeness of the filling operation, which has hitherto been a matter of concern. Moreover, the hydrogen-occlusion alloys 8 fill up the air spaces 7 formed between the heat transfer fins 4, and hence a deviation in density can be restrained. Further, the hydrogen storage tank 100 in the first embodiment does not entail the filling operation of the hydrogen-occlusion alloys 8, and consequently the filling hole 9 and the through-holes, which have hitherto been required, become unnecessary. As a result, a simpler configuration than the conventional hydrogen storage tank 100a can be attained, and the maintenance etc can be done more easily.

Second Embodiment

Next, a method of manufacturing the hydrogen storage tank according to a second embodiment will hereinafter be described. Note that a configuration of the hydrogen storage tank 100 manufactured by the hydrogen storage tank manufacturing method according to the second embodiment is the same as the configuration of the hydrogen storage tank 100 in the first embodiment. The description of the configuration of the hydrogen storage tank 100 in the second embodiment is therefore omitted.

The manufacturing method of the hydrogen storage tank in the first embodiment involves stacking and pressurizing the plate member 20 having its upper surface on which the hydrogen-occlusion alloys 8 are disposed in the stripe pattern and the plate member 30 having its upper surface on which the hydrogen-occlusion alloys 8 are disposed in the strip pattern different from the stripes formed on the plate member 20. By contrast, the manufacturing method of the hydrogen storage tank in the second embodiment is different from the manufacturing method in the first embodiment in terms of such a point that the hydrogen-occlusion alloys 8 are disposed on the lower surfaces as well as on the upper surfaces of the plate members 20, 30, and, on the occasion of stacking the plate members, a plate member 40 on which none of the hydrogen-occlusion alloys 8 are disposed is provided between the plate member 20 and the plate member 30. An in-depth description will hereinafter be made. Note that the same materials of the plate members 20, 30 and the same type etc of the bonding agent 11 as those employed in the first embodiment discussed above, may be used.

Figure 9:
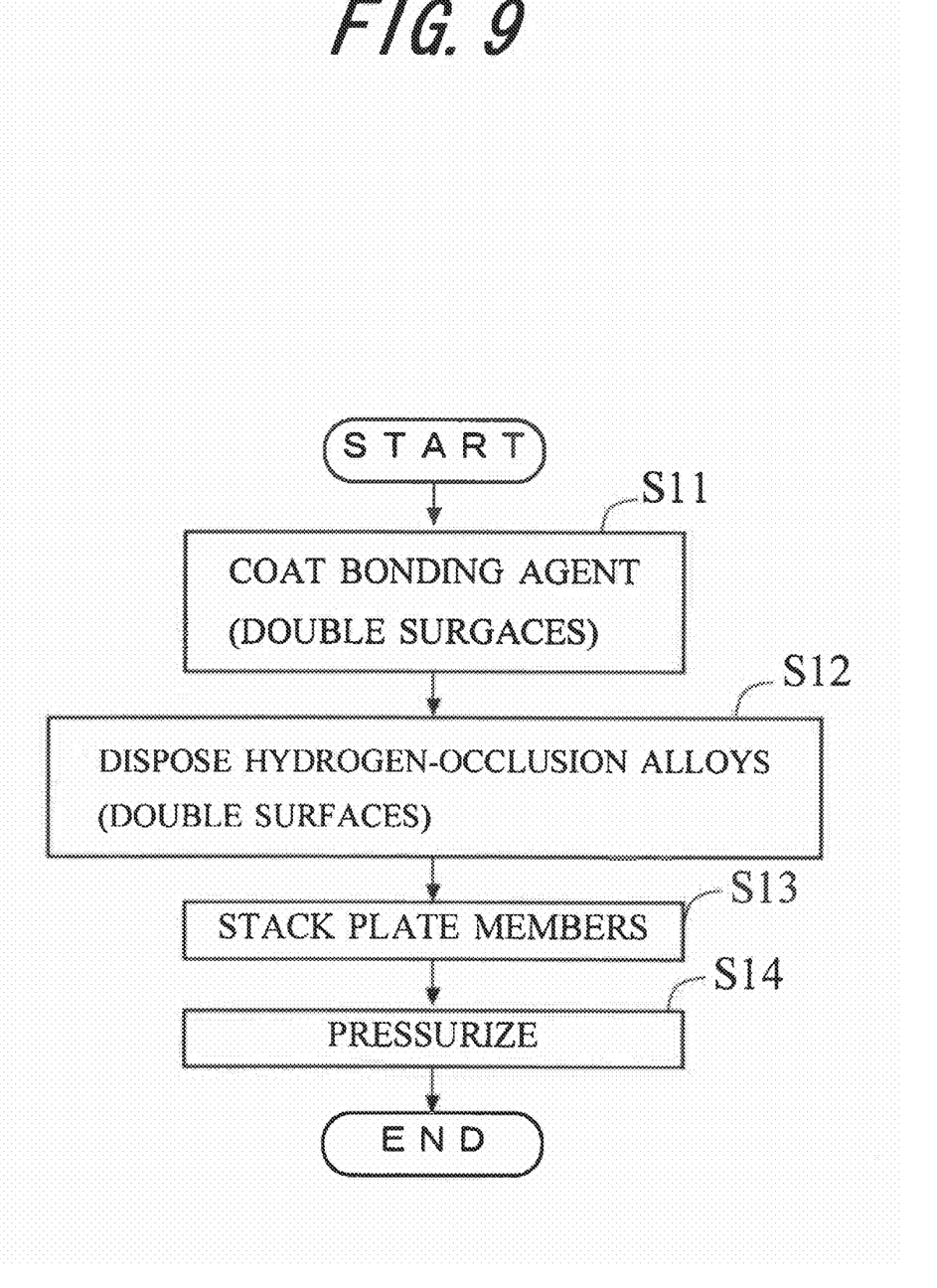
FIG. 9. A flowchart of manufacturing the hydrogen storage tank in a second embodiment.

FIG. 9 shows a flow of manufacturing the hydrogen storage tank according to the second embodiment. In step S11, the bonding agent 11 is applied to plate member 20 and the plate member 30 which build up the heat transfer fins 4. To be specific, the bonding agent 11 is coated in the strip pattern over the upper and lower surfaces of the aluminum plate member 20. Further, the bonding agent 11 is also coated in the strip pattern over the upper and lower surfaces of the plate member 30 composed of aluminum. The width of the strip and the interval between the stripes formed by applying the bonding agent 11 can be designed in the same way as by the manufacturing method of the hydrogen storage tank 100 in the first embodiment. When the coating of the bonding agent 11 is completed, the operation proceeds to step S12.

In step S12, the hydrogen-occlusion alloys 8 are disposed. Incidentally, the hydrogen-occlusion alloys 8 are disposed on the bonding agent 11 that has been applied, which point is not different from the manufacturing method in the first embodiment. In the second embodiment, however, the hydrogen-occlusion alloys 8 are disposed also on the lower surfaces of the plate member 20 and of the plate member 30. Accordingly, a better scheme is that the hydrogen-occlusion alloys 8 are previously molded, and the molded bodies are disposed on the upper and lower surface of the plate member 20 and the plate member 30.

Herein, a molding procedure of the molded body of the hydrogen-occlusion alloys 8 will be explained. To start with, a brazing filler metal used as a cementing material for forming the molded body is added to the powdery hydrogen-occlusion alloys 8. The brazing filler metal is softened when raised up to a predetermined temperature and enables the powders of the hydrogen-occlusion alloys 8 bonded to each other. For example, the aluminum brazing filler, of which a softening temperature (melting temperature) is 350° C., can be used as the brazing filler metal. In the case of using the aluminum brazing filler as the brazing filler metal, the aluminum brazing filler may be added at 1% to a weight of the powdery hydrogen-occlusion alloys 8. Incidentally, it is desirable that the brazing filler to be added be sufficiently uniformly mixed with the powdery hydrogen-occlusion alloys 8, and it is also preferable that the brazing filler be added in an atomized state in which the particle size is smaller than the particle size of the powdery hydrogen-occlusion alloys 8.

Next, the powdery hydrogen-occlusion alloys 8, to which the brazing filler is added, fill up a predetermined container and are thus molded. The predetermined container serves to model (form) an external shape of the hydrogen-occlusion alloys 8 disposed on the plate member 20 and the plate member 30, and can involve using, e.g., a pressure-resistant container composed of a stainless steel. Note that dimensions of the predetermined container may be adjusted to a shape of the hydrogen-occlusion alloys 8 disposed on the plate member 20 and the plate member 30. Accordingly, an inside width of the container may be set to 3 mm through 10 mm, a depth of the container may be set to 3 mm through 10 mm, and a length of the container may be designed corresponding to a length of the plate member.

After the powdery hydrogen-occlusion alloys 8 added with the brazing filler have filled up an interior of the container, a process of activating the powdery hydrogen-occlusion alloys 8 is executed. The activating process connotes a process of degassing the hydrogen-occlusion alloys at a high temperature and hydrogenating the hydrogen-occlusion alloys by reacting with high-pressure hydrogen before being actually used for hydrogen absorption so that the hydrogen-occlusion alloys come to an active state of reversibly occluding and releasing the hydrogen. The activating process is conducted by repeating twice or three times an operation of cooling and maintaining, e.g., the container filled with the powdery hydrogen-occlusion alloys 8 at 10° C. and supplying a hydrogen gas pressurized at 1 MPa for one hour. Conditions for the activating process can be properly set corresponding to the type of the hydrogen-occlusion alloys 8 for use. The hydrogenation is conducted by executing this activating process, whereby the particles constituting the powdery hydrogen-occlusion alloys are further atomized, with the result that an average particle size of the particle becomes 10-30 um. As the particles thus get further atomized, a newborn surface (which is a surface not covered with an oxide film but enabling the hydrogen to be occluded and released) occurs on the powdery hydrogen-occlusion alloys 8, and a specific surface area (area/weight ratio) rises.

After the activating process, the molded body of the hydrogen-occlusion alloys is completed by executing a heating process. In the heating process, the powdery hydrogen-occlusion alloys 8 with the addition of the brazing filler are heated till the brazing filler reaches the softening temperature. For example, the process of heating the whole container filled with the powdery hydrogen-occlusion alloys 8 at 350° C. is conducted for 2 hours. Note that any inconvenience may not be caused by setting shorter the time for the heating process in the case of using the brazing filler of which the melting temperature becomes lower. When the brazing filler is thus softened by heating the brazing filler so as to reach the softening temperature, the softened brazing filler bonds the ambient hydrogen-occlusion alloy particles getting further atomized to each other. The entire powdery hydrogen-occlusion alloys 8 filling up the interior of the container are thereby formed into the molded body corresponding to the shape of the interior of the container. Namely, the column-shaped hydrogen-occlusion alloys 8 are formed. Therefore, the column-shaped hydrogen-occlusion alloys 8 are bonded to the upper and lower surfaces of the plate members 20, 30 through the bonding agent 11, thereby completing the disposition of the hydrogen-occlusion alloys 8. With the completion of disposing the hydrogen-occlusion alloys 8, the operation proceeds to step S13.

Figure 10:
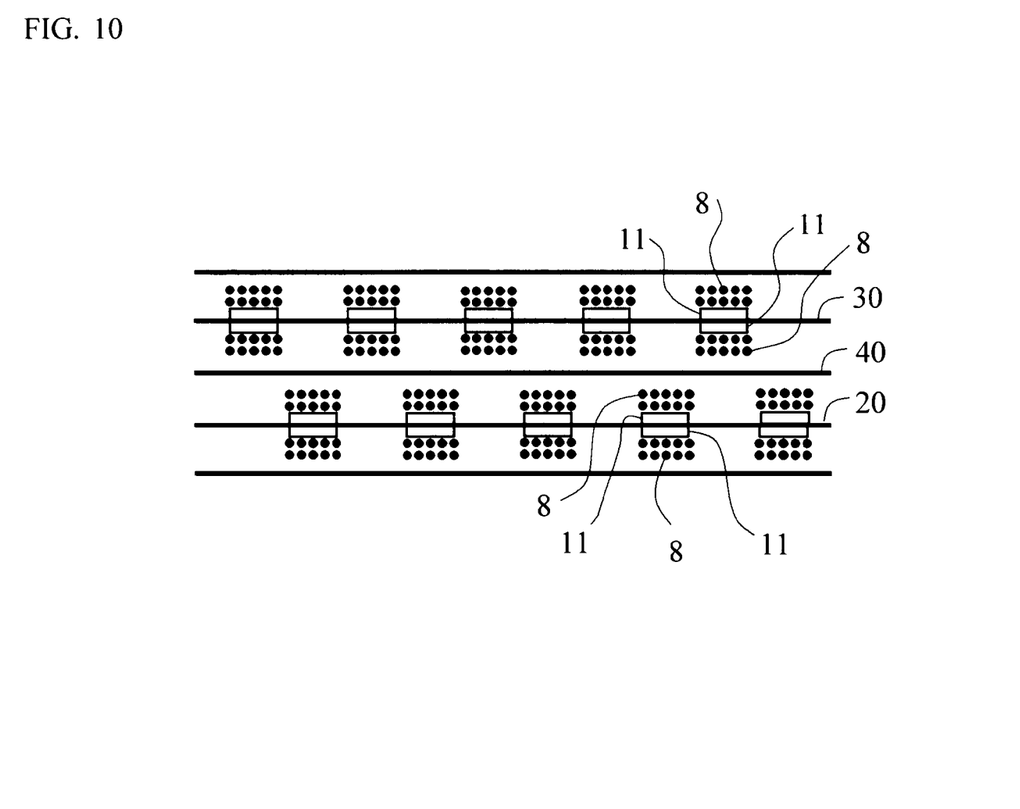
FIG. 10. A view showing a stacked state of the plate members.

In step S13, the plate members 20, 30, 40 are stacked. More specifically, the plate members 20, 30, 40 are stacked in such a manner that the plate member 40 on which none of the hydrogen-occlusion alloys 8 are disposed is stacked above the plate member 20 having its upper and lower surfaces on which the hydrogen-occlusion alloys 8 are disposed, the plate member 30 having its upper and lower surfaces on which the hydrogen-occlusion alloys 8 are disposed so as not to be overlapped with the plate member 20 in the stacking direction is stacked above the plate member 40, and further the plate member 40 is stacked above the previous plate. Note that FIG. 10 illustrates the stacked state of the plate members 20, 30, 40. With the completion of stacking the plate members 20, 30, 40, the operation proceeds to step S14.

Figure 11:
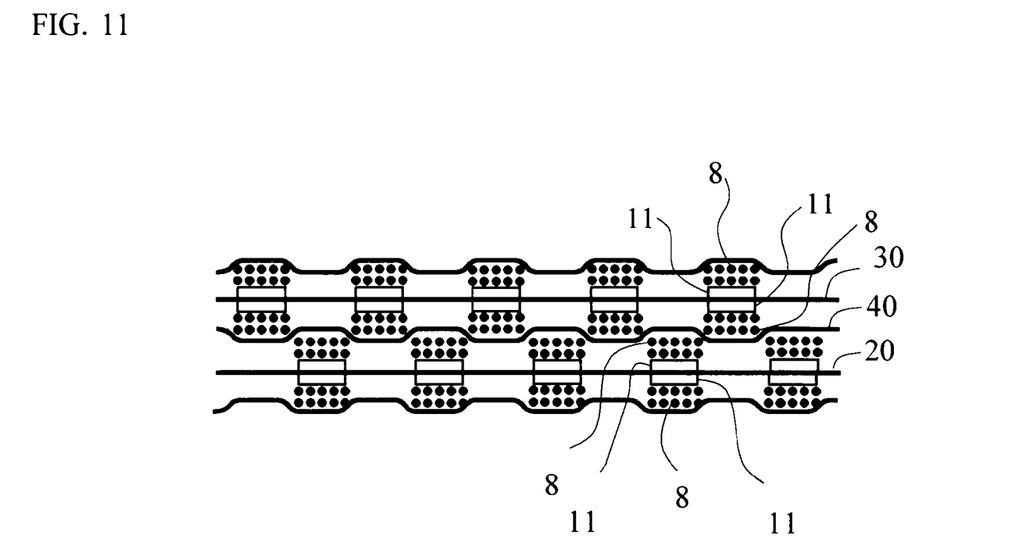
FIG. 11. A view showing a pressurized state of the plate members.
Figure 12:
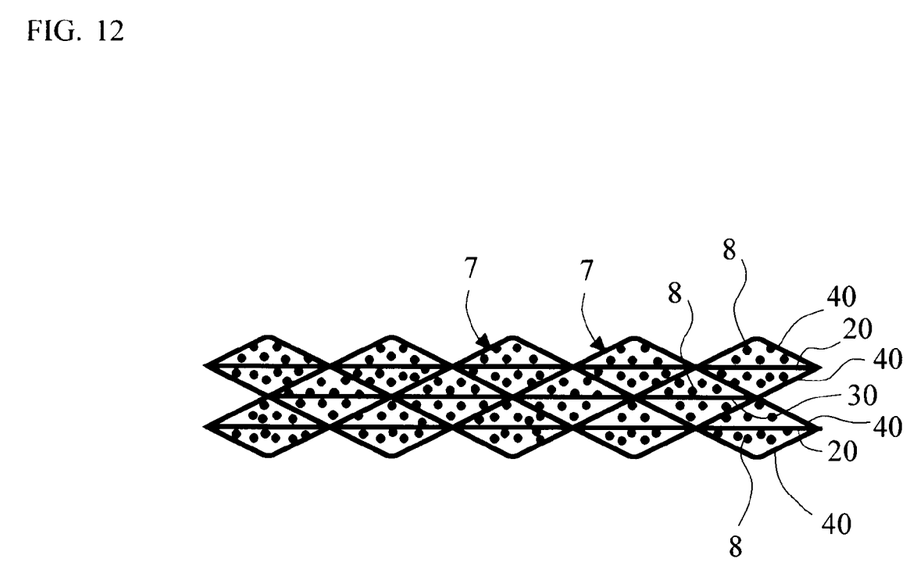
FIG. 12. A view showing a state of the plate members after being further pressurized.

In step S14, the stacked plate members 20, 30, 40 are pressurized in the stacking direction. As a result, the plate members 20, 30, 40 get deformed by the pressure, then the upper surface of the plate member 20 abuts on the lower surface of the plate member 40, and the upper surface of the plate member 40 abuts on the lower surface of the plate member 20. Herein, FIG. 11 illustrates the pressurized state of the plate members 20, 30, 40. As shown in FIG. 11, the plate members 20, 30, 40 get deformed by their being pressurized in the stacking direction. Consequently, in the same way as in the first embodiment, the plurality of air spaces 7 sectioned by the plate members 20, 30, 40 and filled inside with the hydrogen-occlusion alloys 8 is finally formed (see FIG. 12).

Note that upon the completion of forming the air spaces 7 sectioned by the plate members 20, 30, 40 and filled inside with the hydrogen-occlusion alloys 8, in the same way as the manufacturing method of the hydrogen storage tank 100 according to the first embodiment, the stacked plate members 20, 30, 40 may be installed together with the refrigerant/heat medium tube 3 into the tank body 1.

The hydrogen storage tank 100 including the previously built-in hydrogen-occlusion alloys 8 can be manufactured by the manufacturing method of the hydrogen storage tank 100 according to the second embodiment discussed above. Further, in the manufacturing method of the hydrogen storage tank 100 according to the second embodiment, it is preferable that the hydrogen-occlusion alloys 8 be formed into the molded body, thereby improving the workability. Still further, on the occasion of forming the molded body, the powdery hydrogen-occlusion alloys are formed by use of the brazing filler after atomizing the powdery hydrogen-occlusion alloys 8 by executing the activating process, and it is feasible to restrain the hydrogen-occlusion alloys from being further atomized by repeating the operation of occluding and releasing the hydrogen after forming the molded body. As a result, a structure of the molded body can be prevented from being gradually collapsed, and durability of the molded body of the hydrogen-occlusion alloys 8 can be further improved.

MODIFIED EXAMPLE

It is to be noted that the embodiments discussed above have exemplified the so-called fin-and-tube type hydrogen storage tank 100 including the U-shaped refrigerant/heat medium tube 3 as the heat exchanger 2. The present invention is not, however, limited to this configuration, but may take a configuration including a so-called jacket type heat exchanger in which peripheries of the heat exchanger 2 are covered with, e.g., flow path through which to flow the mediums for heating and refrigeration. Namely, the heat exchanger 2 is sufficient if constructed to enable the heat to be exchanged but is not limited to the embodiments discussed above.

Moreover, in the manufacturing method of the hydrogen storage tank 100 according to the first embodiment discussed above, the hydrogen-occlusion alloys 8 are disposed after coating the bonding agent 11 but may also be disposed without coating the bonding agent 11.

The embodiments of the present invention have been discussed so far, however, the hydrogen storage tank and the manufacturing method of the hydrogen storage tank according to the present invention are not limited to these embodiment and can embrace combinations of the configurations thereof to the greatest possible degree.

OTHERS

The disclosures of Japanese patent application No. JP2007-161227 filed on Jun. 19, 2007 including the specification, drawings and abstract are incorporated herein by reference.

What is claimed is:

1. A manufacturing method of a hydrogen storage tank stored with a hydrogen gas by including built-in hydrogen-occlusion alloys, comprising:
    an arranging step of arranging said hydrogen-occlusion alloys so that plate members are each formed with an area in which to dispose said hydrogen-occlusion alloys and an area in which to dispose none of said hydrogen-occlusion alloys;
    a stacking step of stacking said plate members by superimposing said plate members; and
    a pressurizing step of forming air spaces sectioned by said plate members and containing said previously built-in hydrogen-occlusion alloys by pressurizing said plate members in a way that restricts migrations of said hydrogen-occlusion alloys in a stacked state of said plate members, said hydrogen-occlusion alloys being disposed between said neighboring plate members.

2. A manufacturing method of a hydrogen storage tank according to claim 1, wherein,
    said arranging step includes disposing said hydrogen-occlusion alloys on any one of said neighboring plate members,
    said stacking step includes stacking said plate members on which said hydrogen-occlusion alloys are disposed, and
    said pressurizing step includes forming the air spaces sectioned by said plate members and contains therein the previously built-in hydrogen-occlusion alloys by pressurizing said plate members stacked in said stacking step.

3. A manufacturing method of a hydrogen storage tank according to claim 1, wherein said arranging step includes arranging the area in which to dispose said hydrogen-occlusion alloys and the area in which to dispose none of said hydrogen-occlusion alloys in a stripe pattern and disposing said hydrogen-occlusion alloys so that the stripes are not overlapped between said neighboring plate members.

4. A manufacturing method of a hydrogen storage tank according to claim 1, wherein said arranging step includes disposing said hydrogen-occlusion alloys in a way that bonds said hydrogen-occlusion alloys to any one of said neighboring plate members.

5. A manufacturing method of a hydrogen storage tank according to claim 1, wherein a particle size of said hydrogen-occlusion alloys is on the order of 500 um through 1000 um.

6. A manufacturing method of a hydrogen storage tank according to claim 1, wherein,
    said arranging step includes arranging the area in which to dispose said hydrogen-occlusion alloys and the area in which to dispose none of said hydrogen-occlusion alloys in the stripe pattern on any one of said neighboring plate members and disposing said hydrogen-occlusion alloys so that the stripes are not overlapped with each other between said neighboring plate members,
    said stacking step includes stacking said plate members on which said hydrogen-occlusion alloys are disposed, and
    said pressurizing step includes forming the air spaces sectioned by said plate members and contains therein the previously built-in hydrogen-occlusion alloys by pressurizing said plate members stacked in said stacking process.

7. A manufacturing method of a hydrogen storage tank according to claim 1, wherein,
    said arranging step includes arranging the area in which to dispose said hydrogen-occlusion alloys and the area in which to dispose none of said hydrogen-occlusion alloys in the stripe pattern on any one of said neighboring plate members and disposing said hydrogen-occlusion alloys in bonds so that the stripes are not overlapped with each other between said neighboring plate members,
    said stacking step includes stacking said plate members on which said hydrogen-occlusion alloys are disposed, and
    said pressurizing step includes forming the air spaces sectioned by said plate members and contains therein the previously built-in hydrogen-occlusion alloys by pressurizing said plate members stacked in said stacking process.

8. A manufacturing method of a hydrogen storage tank according to claim 1, wherein,
    said arranging step includes arranging the area in which to dispose said hydrogen-occlusion alloys and the area in which to dispose none of said hydrogen-occlusion alloys in the stripe pattern on any one of said neighboring plate members in bonds and disposing said hydrogen-occlusion alloys in bonds so that the stripes are not overlapped with each other between said neighboring plate members,
    said stacking step includes stacking said plate members on which said hydrogen-occlusion alloys are disposed,
    said pressurizing step includes forming the air spaces sectioned by said plate members and contains therein the previously built-in hydrogen-occlusion alloys by pressurizing said plate members stacked in said stacking process; and
    a particle size of said hydrogen-occlusion alloys is on the order of 500 um through 1000 um.

9. A manufacturing method of a hydrogen storage tank according to claim 1, wherein,
    said arranging step includes disposing said hydrogen-occlusion alloys on an upper surface and a lower surface of said plate members;
    said stacking step includes stacking said plate members on which said hydrogen-occlusion alloys are disposed and providing between said neighboring plate members a non-hydrogen-occlusion-alloy plate member; and
    said pressurizing step includes forming the air spaces sectioned by said plate members and said non-hydrogen-occlusion-alloy plate members and contains therein the previously built-in hydrogen-occlusion alloys.

10. A manufacturing method of a hydrogen storage tank according to claim 1, wherein said arranging step includes arranging the area in which to dispose said hydrogen-occlusion alloys and the area in which to dispose none of said hydrogen-occlusion alloys in a stripe pattern on an upper surface and a lower surface of said plate members and disposing said hydrogen-occlusion alloys so that the stripes are not overlapped between said neighboring plate members.

11. A manufacturing method of a hydrogen storage tank according to claim 1, wherein,
    said arranging step includes arranging the area in which to dispose said hydrogen-occlusion alloys and the area in which to dispose none of said hydrogen-occlusion alloys in a stripe pattern on an upper surface and a lower surface of said plate members and disposing said hydrogen-occlusion alloys so that the stripes are not overlapped between said neighboring plate members;

said stacking step includes stacking said plate members on which said hydrogen-occlusion alloys are disposed and providing between said neighboring plate members a non-hydrogen-occlusion-alloy plate member; and said pressurizing step includes forming the air spaces sectioned by said plate members and said non-hydrogen-occlusion-alloy plate members and contains therein the previously built-in hydrogen-occlusion alloys.

* * * * *